United States Patent

Vieweg

Patent Number: 6,067,501
Date of Patent: May 23, 2000

[54] PROCESS AND DEVICE FOR SELECTING TRAFFIC INFORMATION

[75] Inventor: Stefan Vieweg, Düsseldorf, Germany

[73] Assignee: Mannesmann Aktiengesellschaft, Düsseldorf, Germany

[21] Appl. No.: 08/795,557

[22] Filed: Feb. 6, 1997

[30] Foreign Application Priority Data

Feb. 6, 1996 [DE] Germany ............ 196 06 259

[51] Int. Cl.⁷ .................................. G06G 7/78
[52] U.S. Cl. .............. 701/209; 701/207; 701/214
[58] Field of Search .................... 701/209, 117, 701/201, 207, 214; 340/995

[56] References Cited

U.S. PATENT DOCUMENTS

| | | | |
|---|---|---|---|
| 5,428,544 | 6/1995 | Shyu | 701/117 |
| 5,465,089 | 11/1995 | Nakatani et al. | |
| 5,583,494 | 12/1996 | Mizutani et al. | 340/995 |

FOREIGN PATENT DOCUMENTS

| | | |
|---|---|---|
| 93 00 499 | 7/1994 | France . |
| 43 21 437 | 2/1994 | Germany . |
| 43 22 288 | 1/1995 | Germany . |

*Primary Examiner*—William A. Cuchlinski, Jr.
*Assistant Examiner*—Arthur D. Donnelly
*Attorney, Agent, or Firm*—Cohen, Pontani, Lieberman & Pavane

[57] ABSTRACT

A process for selecting traffic information received by or to be sent from a vehicle, whereby the selection is carried out in the vehicle in dependence on a type of road on which the vehicle is travelling at a given moment. The process including carrying out at the vehicle a segment-by-segment determination of a geometric route of the vehicle, whereby information on a particular segment of the geometric route includes at least relative positions of a starting and ending points of the segment, comparing the segment of the route to characteristic geometric parameters of road types, and, from this comparison, determining the road type currently being travelled and using the road type as a selection criterion.

9 Claims, 2 Drawing Sheets

PROCESS AND DEVICE FOR SELECTING TRAFFIC INFORMATION

BACKGROUND OF THE INVENTION

1. Field of the Invention

The invention relates to a process for the selection, in a vehicle, of traffic information received or to be sent. The selection is carried out in dependence on the type of road on which the vehicle is travelling. The invention also relates to a device for implementing this process.

2. Description of the Prior Art

Collecting data on and describing a traffic situation is an essential task in the field of traffic telematics, the goal of which is to eliminate and avoid traffic congestion to the greatest extent possible by directing drivers in advance to less crowded roads. For this purpose, the use of stationary collection devices installed at the roadside (e.g., distance markers, induction loops, etc.) is known. However, this involves great expense for creating and maintaining the required infrastructure; it is also disadvantageous that such devices, depending on the system, have extremely limited local ranges of use. To collect data about the traffic situation throughout a wide area, it is therefore necessary to install a huge number of collection devices.

Recent attempts to collect data on the traffic situation without the use of permanently installed roadside devices are also known. In such systems information is sent from the vehicles of a sampling fleet to collection points (e.g., traffic direction centers). In effect, this creates measurement station that move along with the traffic ("floating probes") and transmit relevant data (especially vehicle speed) via mobile wireless communications devices (e.g., mobile phones) to individual data collection points for further processing and evaluation. The results can then be sent to a large number of drivers in the form of traffic advice and recommendations for alternate routes, so that drivers can make the best possible decision, depending on the traffic situation, about the routes to choose.

Often, individual tasks in traffic telematics are limited to certain traffic segments, e.g., long-distance traffic on highways or city traffic. In collecting traffic data, it is of interest to have the relevant traffic information sent to the data collection points only from those vehicles that are located on a particular given type of road. Advantageously, this is done in a fully automatic manner by suitable terminal devices in the vehicles of a sampling fleet. In this way, the load placed on the data channels of the communications system being used can be kept within tolerable limits. It should be possible for each vehicle to autonomously recognize the road type.

This process requires a suitable location-finding system to determine the current position of a vehicle; for example, devices based on navigation satellites. In addition, it has been necessary until now for a digitized road map to be carried along in the vehicle, from which, in reference to the positional data supplied by the location-finding system, the actual road being travelled on could be determined by appropriate "map matching." However, difficulties can result from the fact that the determination of position is subject to a certain imprecision, which can be so great that often no unambiguous assignment of the current position to one of several possible roads (closely adjacent) is possible. Furthermore, carrying along a digitized road map (e.g., on CD-ROM) represents a considerable expense; specifically, the costs of the required memory and reading devices and, secondly, the costs of updating the map to keep it current. The possibility of shifting the task of recognizing road types to the data collection points and then reporting the results back to the vehicles is not a useful one, because of the extraordinary communications expense.

There is therefore a need to be able to automatically determine the road type being travelled on in the vehicle with sufficient accuracy and without great expense. This is useful in the framework of determining and collecting traffic data. Furthermore, it is also advantageous for traffic information to be received from drivers (e.g., via radios, mobile phones or other communications means) and stored so that it can be called up again at any time, as desired by the drivers, from a memory device. When a vehicle travelling a long distance is located on a highway, for example, traffic information about side streets is generally not of interest. For ergonomic reasons and in view of the required memory, it is useful to place limitations on the displayed or stored information. In order to limit the information, it would therefore be helpful to undertake an automatic selection of received information in the receiver device, so that only relevant traffic information, depending on road type, is displayed or stored.

SUMMARY OF THE INVENTION

Accordingly, it is an object of the present invention to provide a process for the selection of traffic information received by or to be sent from a vehicle, whereby the selection is carried out in the vehicle in dependence on the type of the road being travelled by the vehicle at the moment and no digital road map needs to be carried along in the vehicle for the purpose of vehicle-autonomous recognition of road type. A further object is to provide a device that implements this process.

Pursuant to these objects, and others which will become apparent hereafter, one aspect of the present invention resides in a process in which a segment-by-segment determination of the geometric route travelled by the vehicle is undertaken in an ongoing fashion by means of a device carried along in the vehicle and generally described as a location-finding device. Location-finding devices in this sense can include, for example, devices for determining position by satellite navigation and—individually or in combination with one another—wheel sensors, tachometers or odometers, acceleration sensors, gyroscopic and magnetic field sensors, and the like. The information on a particular segment of the route (e.g., a segment from 200 to 500 m) includes at least the positions relative to one another of the starting point and ending point of the segment. In the simplest case, this can be the distance between the two points. However, it is also possible to indicate the position data on the two points in a relative or an absolute system of coordinates. Advantageously, at least four points are used to describe a segment of the route. Good information is provided, in particular, by directional indications concerning the route at the points in question.

The recognition principle of the invention is based on the fact that certain types of roads (e.g., highways and divided highways, on the one hand, and city streets and side streets, on the other) can be distinguished from one another with relatively high dependability by means of characteristic geometric features. The invention therefore calls for the geometric route ascertained segment-by-segment to be compared to characteristic geometric parameters of particular road types, in the sense of pattern recognition. Especially suitable for such a parameter, for example, is the smallest permissible curve radius for the particular road type. This limit value is significantly larger for an interstate highway than for a side street or a highway. Similar information content can be obtained by indicating the maximum permissible direction change relative to a segment that has been travelled. Another possibility is to extrapolate a determined course of a route segment and compare the predicted position to the position subsequently actually measured, and to compare the amount of deviation (distance) to a maximum permissible deviation dependent on road type.

For the most reliable possible implementation of the invention, it is essential that the relative measurement accuracy at the individual measurement points on the route segment be significantly better than the quantity of the characteristic geometric parameters of the road type. In finding the position of individual measurement points, therefore, what matters is not the exact absolute position, but rather the most exact possible determination of the individual positions relative to each other. This method allows statements to be made with high reliability about which type of road the individual vehicle of a sampling fleet is located on at the moment. It is also possible, for example, to distinguish heading for a highway parking spot or rest stop or changing from one highway to another from using a highway exit and travelling further on a local highway. What is characteristic of the invention is that time does not have to be taken into consideration; rather, only geometric information concerning the route travelled is relied upon. Major adventage of such procedure is that even in congested traffic situations a reliable road type detection is possible.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
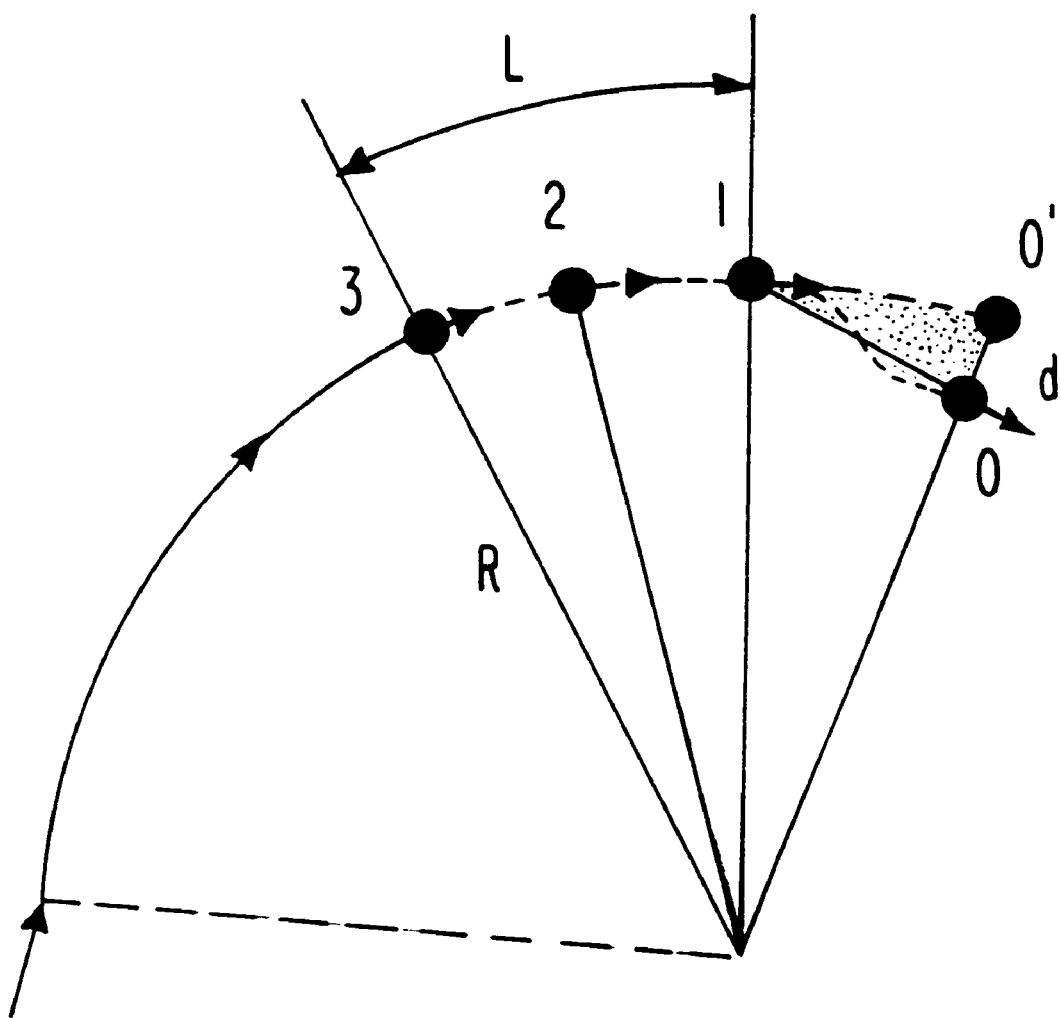
FIG. 1 schematically represents an example of a segment of a route travelled.

FIG. 1 schematically shows the geometric route travelled by a vehicle, which has reached the measured positions 3, 2 and 1, one after the other. From this route, a comparison with suitable characteristic geometric parameters of a road type can already be carried out. For example, the approximate curve radius R can be found from this route and compared to a preestablished limit value for that road type. Another possibility is a comparison of the actual directional changes, relative to the segment length L, between the points 3 and 1 and a corresponding preestablished limit value dependent on road type. However, an extrapolation of the measured segment between points 3 and 1 to the predicted point 0' could also be carried out. A comparison with the position 0 actually reached by the particular vehicle in question yields a deviation d. If the value of d is greater than another preestablished limit value dependent on road type, then this is an indication that the road type taken by the vehicle has changed or, if an expressway is being travelled on, that a parking spot or an exit is being used at the moment. For the most unambiguous possible classification as a particular road type, it is advisable to use multiple independent criteria as a basis for the decision if possible.

Figure 2:
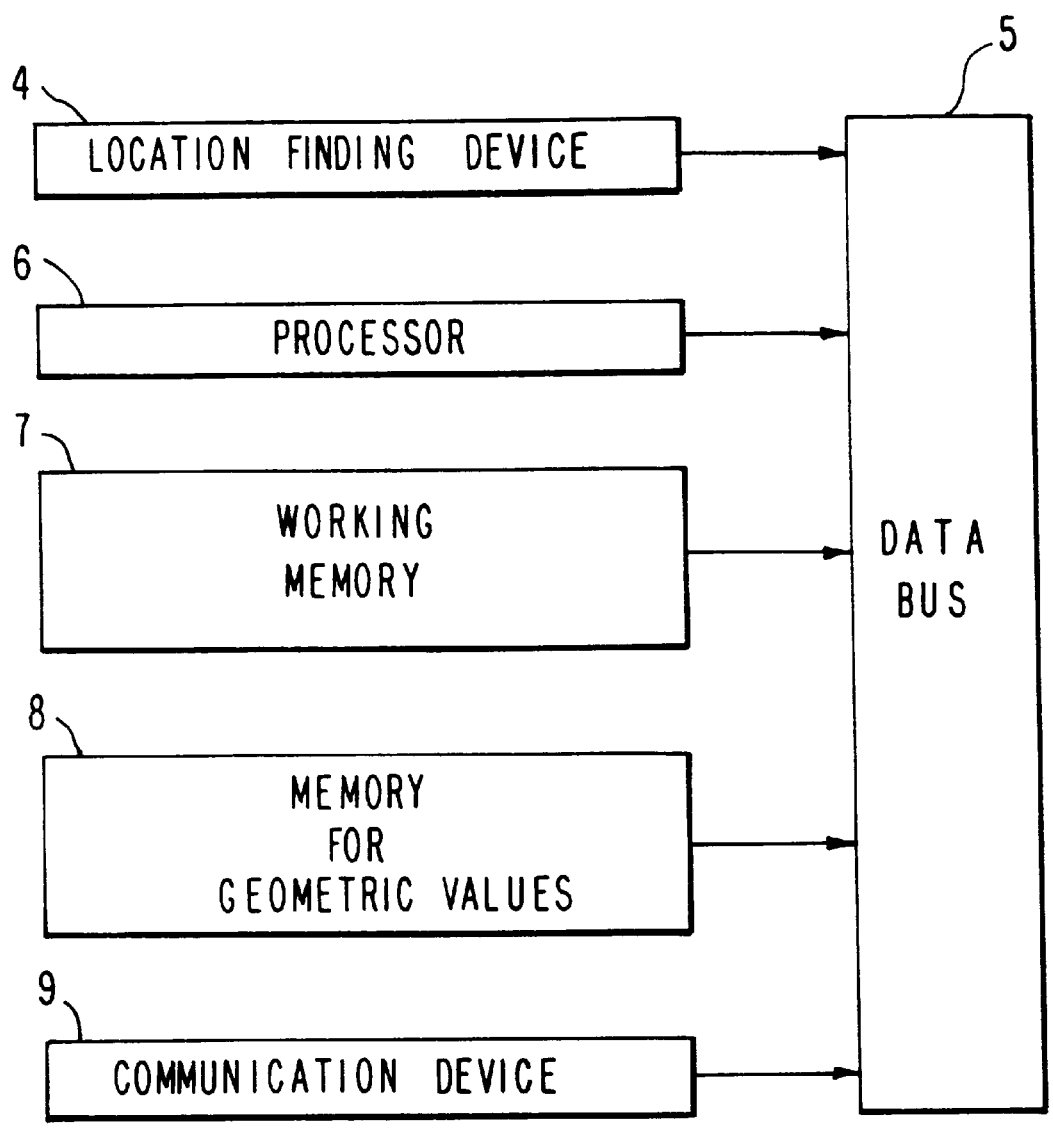
FIG. 2 is a block diagram of a device according to the invention.

The functional schematic in FIG. 2 of a device for implementing the process according to the invention has a location-finding device 4, a computing processor 6, a working memory 7 for a computing program and collected data as well as a memory 8 with permanent preestablished values. These preestablished values are characteristic geometric parameters characteristic of certain road types, so that the road type can be identified by comparing the route of a vehicle to these preestablished values. Since the location-finding device 4, the computing processor 6, the working memory 7 and the memory 8 with the preestablished values are connected to each other via a data bus 5, the comparison for the purpose of identifying the road type can be carried out by the processor 6. For this purpose, the computing program of the working memory 7 is designed so that the geometric data concerning a segment of the route supplied directly or indirectly (i.e., after conversion) by the location-finding device 4 are compared to the geometric parameters from the memory 8 in the sense of pattern comparison. Depending on the results of this comparison, i.e., depending on the road type identified, the processor 6 is then able to act upon a communications device 9, which is also connected to the data bus 5, in order to transmit the determined traffic data to a data collection point or to cause the received traffic information to be stored or suppressed. The communications device 9 can, for example, be a radio device with storage capabilities for traffic information or a mobile telephone, which is installed in a vehicle of a sampling fleet.

Using simple commercially available electronic components, the invention permits sufficiently reliable vehicle-autonomous identification of the particular road type being travelled on, without requiring for this purpose any manual intervention or that a digital road map be carried in the vehicle. Of course, for example, if an on-board destination guidance system in the vehicle makes a digital road map available anyway, the invention can also be used to take additional advantage of the information obtainable from this. This would increase the certainty of correct identification of the particular road type to practically 100%. In this context, the selection of traffic information could consist, for example, of displaying the total received traffic information on the display device of the destination guidance system only to the extent (e.g., as a symbol) to which it is applicable to roads of the type that the vehicle is travelling on at the moment.

The invention is not limited by the embodiments described above which are presented as examples only but can be modified in various ways within the scope of protection defined by the appended patent claims.

I claim:

1. A process for selecting traffic information received by or to be sent from a vehicle, whereby the selection is carried out in the vehicle in dependence on a type of road on which the vehicle is travelling at a given moment, comprising the steps of: carrying out at the vehicle a segment-by-segment determination of a geometric route of the vehicle, whereby information on a particular segment of the geometric route includes at least relative positions of starting and ending points of the segment; comparing the segment of the route to characteristic geometric parameters of road types; and, from this comparison, determining the road type currently being travelled and using the road type as a selection criterion.

2. A process as defined in claim 1, wherein the relative positions of the starting and ending points are indicated by a distance from one another.

3. Process as defined in claim 1, wherein the relative positions of the starting and ending points are indicated by position data.

4. A process as defined in claim 1, wherein the segment of the geometric route is indicated by position data of at least four points of the segment.

5. A process as defined in claim 1, wherein the segment-by-segment determination step includes collecting information on a direction of travel of the vehicle at individual points along the route and using the direction information in the comparing step.

6. A process as defined in claim 1, wherein the comparing step includes comparing the segment of the route to a smallest permissible curve radius of the road for a particular road type.

7. A process as defined in claim 1, wherein the comparing step includes comparing the segment of the route to a maximum permissible directional change per segment travelled.

8. A process as defined claim 1, wherein the comparing step includes comparing the segment of the route to a maximum permissible deviation of an actually reached position from a predicted position for a route segment.

9. A device in a vehicle for selecting traffic information, comprising: a computing processor; a working memory configured to hold a computing program and collected data; a memory for permanent preestablished values, the preestablished values including characteristic geometric parameters that are characteristic of particular road types; a location-finding device; communications means for receiving and transmitting information; and a data bus arranged to connect together the computing processor, the working memory, the memory and the location-finding device, the computing program being based on a comparison of collected geometric data of a segment of a route supplied by the location-finding device to the characteristic geometric parameters from the memory, the computing processor being configured to act upon the communications means so that one of a transmission of traffic information and the storing and display of received traffic information is selectively carried out depending on a result of a completed road-type recognition.

* * * * *